US012657762B2

(12) United States Patent
Srinivasan et al.

(10) Patent No.: US 12,657,762 B2
(45) Date of Patent: Jun. 16, 2026

(54) DEVICE AND METHOD FOR MULTI-USER EYE-TRACKING

(71) Applicant: IITM, Indian Institute of Technology Madras (IIT Madras), Chennai (IN)

(72) Inventors: Rajagopalan Srinivasan, Chennai (IN); Babji Srinivasan, Chennai (IN); Rahul Madbhavi, Chennai (TN); Santosh Sriram, Chennai (IN); Valuthottiyil Shajahan Thasnimol, Chennai (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 0 days.

(21) Appl. No.: 18/840,083

(22) PCT Filed: Feb. 20, 2023

(86) PCT No.: PCT/IN2023/050164
§ 371 (c)(1),
(2) Date: Aug. 21, 2024

(87) PCT Pub. No.: WO2023/157028
PCT Pub. Date: Aug. 24, 2023

(65) Prior Publication Data
US 2025/0191217 A1 Jun. 12, 2025

(30) Foreign Application Priority Data

Feb. 21, 2022 (IN) .............................. 202241008959

(51) Int. Cl.
*G06V 10/141* (2022.01)
*G06T 7/73* (2017.01)
(Continued)

(52) U.S. Cl.
CPC .............. *G06T 7/73* (2017.01); *G06V 10/141* (2022.01); *G06V 40/166* (2022.01); *G06V 40/19* (2022.01); *G06T 2207/30201* (2013.01)

(58) Field of Classification Search
CPC ............ G06T 7/73; G06T 2207/30201; G06V 10/141; G06V 40/166; G06V 40/19;
(Continued)

(56) References Cited

U.S. PATENT DOCUMENTS 12,314,967 B2 * 5/2025 Furukawa .......... G06Q 30/0201
2017/0344110 A1 * 11/2017 Yoshioka ............. G06V 40/193
(Continued)

*Primary Examiner* — John W Miller
*Assistant Examiner* — Humam M Satti

(57) ABSTRACT
Embodiments herein provide a device (1000) for multi-user eye-tracking in an environment. The device (1000) includes a plurality of illumination sources (110) configured to illuminate faces users gazing region of interest in the environment and imaging sensors (120) configured to capture image of the users gazing the region of interest in the environment. The device (1000) also includes an eye-tracking unit (130) configured to determine an identity of the user in the captured image; identify a user profile corresponding to the identified user based on the determined identity; determine gaze parameters of the identified user based on the user profile. Further, the eye-tracking unit (130) is configured to determine gaze directions of the identified user based on the gaze parameters and determine the area of interest to the identified user based on the gaze directions.

20 Claims, 5 Drawing Sheets

(51) Int. Cl.
*G06V 40/16* (2022.01)
*G06V 40/19* (2022.01)

(58) Field of Classification Search
CPC ...... G06V 10/14; G06V 40/171; G06V 40/18;
G06V 40/193; G02B 27/0093; G06F
3/012; G06F 3/0304; G06F 3/013
See application file for complete search history.

(56) References Cited

U.S. PATENT DOCUMENTS

| 2018/0081434 | A1* | 3/2018 | Siddiqui | ................. | G06F 3/013 |
| 2019/0043218 | A1* | 2/2019 | Hiltner | .................. | H04N 23/60 |
| 2019/0244386 | A1* | 8/2019 | Fisher | .................... | G06F 16/53 |
| 2022/0254058 | A1* | 8/2022 | Liu | ........................... | G06T 7/73 |

* cited by examiner

| Sl. No. | Description |
|---|---|
| 101 | CPU |
| 105 | Monitors |
| 110 | Illumination sources with driver circuits |
| 120 | Imaging Sensors |
| 130 | Eye-tracking unit |
| 140 | Control unit |
| 170 | Power source |
| 180 | Areas of interest |
| 190 | User environment objects |

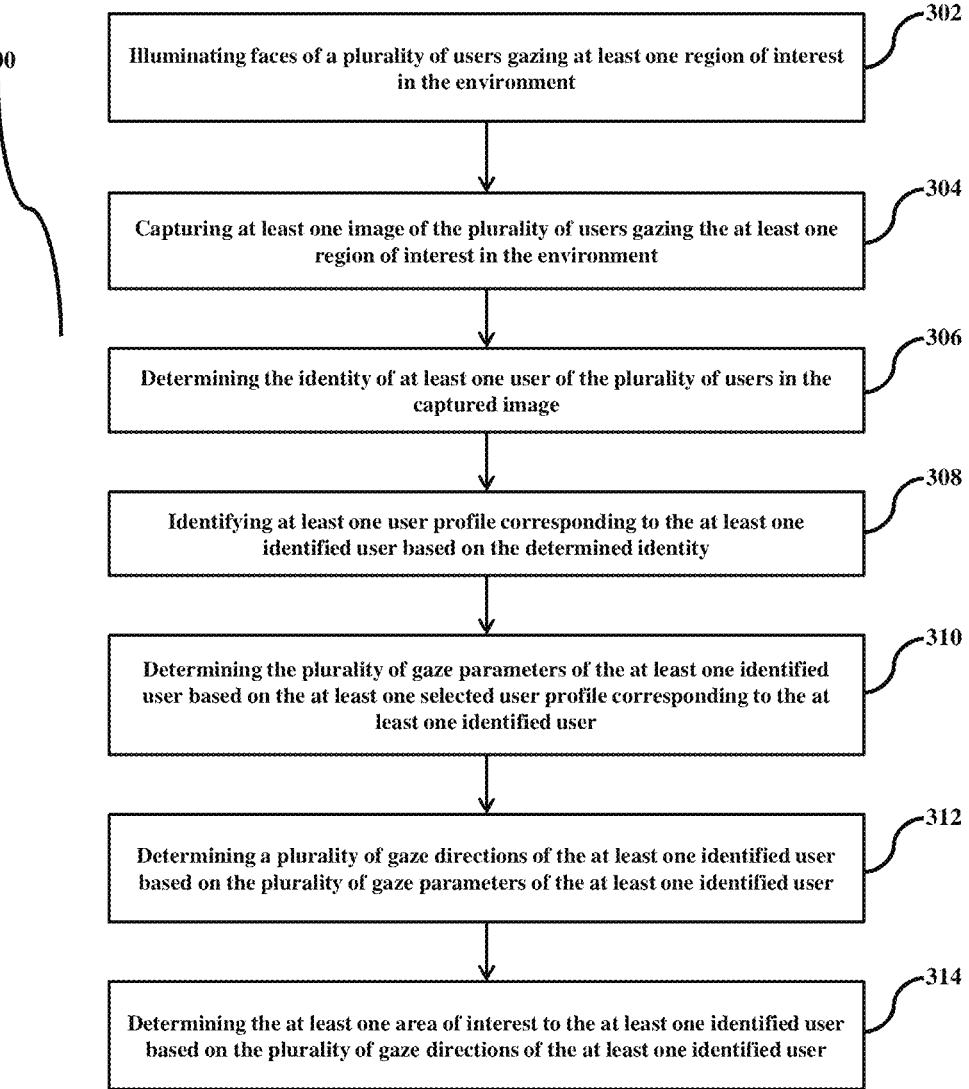

300

302
Illuminating faces of a plurality of users gazing at least one region of interest in the environment 304
Capturing at least one image of the plurality of users gazing the at least one region of interest in the environment 306
Determining the identity of at least one user of the plurality of users in the captured image 308
Identifying at least one user profile corresponding to the at least one identified user based on the determined identity 310
Determining the plurality of gaze parameters of the at least one identified user based on the at least one selected user profile corresponding to the at least one identified user 312
Determining a plurality of gaze directions of the at least one identified user based on the plurality of gaze parameters of the at least one identified user 314
Determining the at least one area of interest to the at least one identified user based on the plurality of gaze directions of the at least one identified user

FIG. 3

DEVICE AND METHOD FOR MULTI-USER EYE-TRACKING

The embodiments herein relate to eye-tracking. More particularly relates to a device and method for multi-user eye-tracking. The present application is based on, and claims priority from an Indian Application No. 202241008959 filed on 21 Feb. 2022, PCT/IN2023/050164 filed on 20 Feb. 2023, the disclosure of which is hereby incorporated by reference herein.

FIELD OF INVENTION

Background of the Invention

Generally, eye trackers are devices used for determining various parameters related to eyes of users which include but are not limited to point of gaze, pupil size, iris size, eye location, etc. The eye trackers can be used in a wide range of applications including but not limited to: human performance monitoring in industry (examples: monitoring real time human behavior data for error detection, quantifying knowledge transfer in training, monitoring driver behavior), market research (examples: obtaining insights into shoppers behavior at a supermarket, evaluating effectiveness of advertising, packaging, user interaction with products) and scientific research.

The eye trackers are majorly available in three broad forms which include head-mounted eye trackers, screen-mounted eye trackers and remote eye trackers. The remote eye trackers are the most flexible form of the eye trackers. However, there are not many remote eye trackers available which can be easily used for the purposes mentioned above. Further, none of the eye trackers available are capable of tracking multiple users simultaneously as is common in many real-world environments. Thus, it is desired to address the above mentioned disadvantages or other shortcomings or at least provide a useful alternative.

OBJECT OF INVENTION

The principal object of the embodiments herein is to provide a device and method for multi-user eye-tracking in an environment having multiple regions of interest based on gazing direction of multiple users, in real-time.

SUMMARY

Accordingly, the embodiments herein provide a device for multi-user eye-tracking. The device includes a plurality of illumination sources, a plurality of imaging sensors and an eye-tracking unit. The plurality of illumination sources is configured to illuminate faces of a plurality of users gazing at least one region of interest in the environment. The plurality of imaging sensors are configured to capture at least one image of the faces of the plurality of users gazing the at least one region of interest in the environment. The eye-tracking unit is configured to determine an identity of at least one user of the plurality of users in the captured image, identify at least one user profile corresponding to the at least one identified user based on the determined identity and determine a plurality of gaze parameters of the at least one identified user based on the at least one selected user profile corresponding to the at least one identified user. The eye-tracking unit is also configured to determine a plurality of gaze directions of the at least one identified user based on the plurality of gaze parameters of the at least one identified user; and determine the at least one area of interest to the at least one identified user based on the plurality of gaze directions of the at least one identified user.

In an embodiment, the plurality of gaze parameters comprises a pupil size of the at least one identified user, a location of each eye of the at least one identified user in the captured image and an orientation of a head of the at least one identified user in the captured image.

In an embodiment, the eye-tracking unit configured to capture the at least one image of the faces of the plurality of users gazing at at least one region of interest in the environment includes illuminating faces of the plurality of users gazing the at least one region of interest in the environment; control the plurality of imaging sensors based on the user profiles and the environment profile; and capture the at least one image of the faces of the plurality of users gazing the at least one region of interest in the environment.

In an embodiment, the eye-tracking unit configured to identify the at least one user profile corresponding to the at least one identified user, based on the determined identity includes determining the head orientation and pupil location of the at least one identified user; determine a plurality of points of interest in the environment to the at least one identified user; and identify at least one user profile corresponding to the at least one identified user.

In an embodiment, the eye-tracking unit configured to determine the plurality of gaze parameters of the at least one identified user based on the at least one selected user profile corresponding to the at least one identified user includes extracting the faces of the plurality of users from the at least one captured image and identifying a plurality of points of interest in the extracted faces of the plurality of users related to the eyes based on the at least one user profile corresponding to the at least one identified user. The device is also configured to extract a portion of image capturing the eyes in the extracted human faces based on the identified plurality of points of interest; and determine the plurality of gaze parameters of the at least one identified user from the extracted portion of the image capturing the eyes.

In an embodiment, the eye-tracking unit configured to determine the gaze direction of the at least one identified user based on the plurality of gaze parameters of the at least one identified user includes comparing the determined plurality of gaze parameters of the identified users with the at least one user profile corresponding to the at least one identified user, wherein the at least one user profile corresponding to the at least one identified user is present in a database of user profiles. Further, the device is also configured to determine a plurality of eye-ball models for the identified users and determine the plurality of gaze directions of the identified users based on the plurality of eye-ball models of the identified users.

In an embodiment, the eye-tracking unit configured to determine the at least one area of interest to the at least one identified user based on the plurality of gaze directions of the at least one identified user includes determining a plurality of intercepts of the plurality of gaze directions of the at least one identified user with a plurality of areas of interests in the environment from a database of environmental profiles; and determining the plurality of areas of interest in the environment that encloses the intercept of the areas of interest in the environment and the gaze direction.

In an embodiment, the regions interest in the environment are imaginary surfaces in the environment where the eye gaze tracking is to be performed.

In an embodiment, further the device includes a control unit, wherein the control unit is configured to perform at least one of: control the plurality of imaging sensors and orient the plurality of imaging sensors relative to a common grid of reference; control the plurality of illumination sources, and orient the plurality of areas of interest in the environment and the plurality of imaging sensors with respect to a fixed point of reference in the environment.

In an embodiment, further the device includes a user profile database and an environmental profile database.

Accordingly, the embodiments herein provide a method for multi-user eye-tracking in an environment by a device. The method includes illuminating, by the device, faces of a plurality of users gazing at least one region of interest in the environment and capturing, by the device, at least one image of the plurality of users gazing the at least one region of interest in the environment. Further, the method includes determining, by the device, an identity of at least one user of the plurality of users in the captured image and identifying, by the device, at least one user profile corresponding to the at least one identified user based on the determined identity. The method also includes determining, by the device, a plurality of gaze parameters of the at least one identified user based on the at least one selected user profile corresponding to the at least one identified user; determining, by the device, a plurality of gaze directions of the at least one identified user based on the plurality of gaze parameters of the at least one identified user; and determining, by the device, the at least one area of interest to the at least one identified user based on the plurality of gaze directions of the at least one identified user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 3 is a flow chart illustrating a method for multi-user eye-tracking in an environment by the device, according to the embodiments as disclosed herein;

DETAILED DESCRIPTION OF INVENTION

Figure 1:
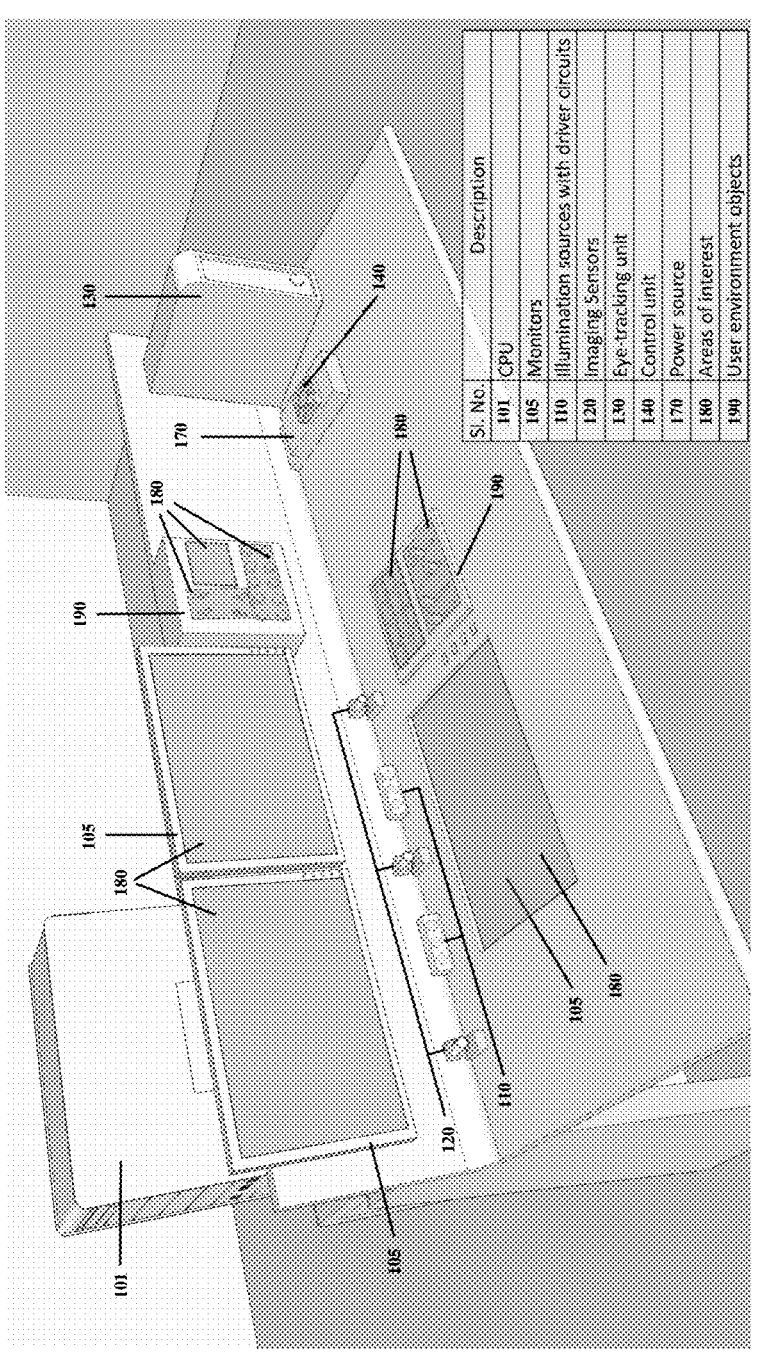
FIG. 1 illustrates a device for multi-user eye-tracking in an environment, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a device for multi-user eye-tracking in an environment. The device includes a plurality of illumination sources, a plurality of imaging sensors and an eye-tracking unit. The plurality of illumination sources is configured to illuminate faces of a plurality of users gazing at least one region of interest in the environment. The plurality of imaging sensors are configured to capture at least one image of the faces of the plurality of users gazing the at least one region of interest in the environment. The eye-tracking unit is configured to determine an identity of at least one user of the plurality of users in the captured image, identify at least one user profile corresponding to the at least one identified user based on the determined identity and determine a plurality of gaze parameters of the at least one identified user based on the at least one selected user profile corresponding to the at least one identified user. The eye-tracking unit is also configured to determine a plurality of gaze directions of the at least one identified user based on the plurality of gaze parameters of the at least one identified user; and determine the at least one area of interest to the at least one identified user based on the plurality of gaze directions of the at least one identified user.

Accordingly, the embodiments herein provide a method for multi-user eye-tracking in an environment by a device. The method includes illuminating, by the device, faces of a plurality of users gazing at least one region of interest in the environment and capturing, by the device, at least one image of the plurality of users gazing the at least one region of interest in the environment. Further, the method includes determining, by the device, an identity of at least one user of the plurality of users in the captured image and identifying, by the device, at least one user profile corresponding to the at least one identified user based on the determined identity. The method also includes determining, by the device, a plurality of gaze parameters of the at least one identified user based on the at least one selected user profile corresponding to the at least one identified user; determining, by the device, a plurality of gaze directions of the at least one identified user based on the plurality of gaze parameters of the at least one identified user; and determining, by the device, the at least one area of interest to the at least one identified user based on the plurality of gaze directions of the at least one identified user.

The conventional methods and systems detect the eye alone based on some difference in location from the previous frame captured. In order to incorporate gaze tracking for multiple users, entire face position needs to be taken into consideration in each frame with the entire face location required in each frame to estimate head vector which is an imaginary axis predicting direction in which the human is facing. However, the conventional methods and systems do not provide user specific calibration to improve accuracy of the gaze estimation.

The conventional methods and systems provide gaze point estimation only on a single screen system and not on an unconstrained environment.

Unlike the methods and systems which use depth of only eyeball with respect to cameras, in the proposed method the device is used to measure depths of any object placed in the frame of the 3 or more cameras Unlike the methods and systems, in the proposed method the gaze estimation is projected onto a multi-screen system (where the screens correspond to multiple objects of the real world).

The conventional methods and systems work on principle of reflection of light emitted from sources (of different wavelength) onto the eye and detected by the detector to measure gaze estimation. Unlike the conventional methods and systems, in the proposed method achieves high accuracy of the gaze estimation using user calibration. The light source used in the proposed method operates through same wavelengths on all sources.

Unlike the conventional methods and systems, in the proposed method provides a remote eye tracker which can be set up in any environment comprising for example, digital displays, other screens, physical objects, panels & switches, etc., (190). The proposed method implements multi user eye tracking in the aforesaid environment and can provide information about each users' eye gaze in frequent intervals.

Referring now to the drawings, and more particularly to FIGS. 1 through 4C, where similar reference characters denote corresponding features consistently throughout the figures, there are shown preferred embodiments.

FIG. 1 illustrates a device (1000) for multi-user eye-tracking in an environment, according to the embodiments as disclosed herein.

Referring to the FIG. 1, the device (1000) for multi-user eye-tracking is developed to track eye gaze of multiple users in unconstrained environments. The device (1000) includes a plurality of illumination sources (110) configured to illuminate faces of a plurality of users gazing at a region of interest in the environment. The illumination sources (110) can be for example but not limited to:

The device (1000) includes a plurality of imaging sensors (120) configured to capture images of the faces of the plurality of users gazing the region of interest in the environment. The imaging sensors (120) can be for example but not limited to: Monochrome area scan image sensors that are sensitive to near IR spectrum.

The control unit (140) is communicatively coupled to the imaging sensors (120) and is configured to illuminate faces of the users gazing the region of interest in the environment and control the plurality of imaging sensors (120) based on the user profiles and the environment profile; and initiate the capture of the image of the faces of the users gazing the region of interest in the environment. The regions of interest in the environment are imaginary surfaces in the environment where the eye gaze tracking is to be performed.

The device (1000) includes an eye-tracking unit (130) is configured to determine an identity of the users in the captured image and identify a user profile corresponding to the identified users based on the determined identity. The user profile corresponding to the identified users based on the determined identity is determined by the eye-tracking unit (130) comprises determine the head orientation and pupil location of the at least one identified user; determine a plurality of points of interest in the environment to the at least one identified user; and identify at least one user profile corresponding to the at least one identified user.

Further, the eye-tracking unit (130) is configured to determine a multiple gaze parameters of the identified user based on the user profile corresponding to the identified user. The multiple gaze parameters are for example but not limited to: a pupil size of the identified user, a location of each eye of the identified user in the captured image and an orientation of a head of the identified user in the captured image, etc. The multiple gaze parameters of the identified user are determined by the eye-tracking unit (130) by configuring to extract the faces of the plurality of users from the captured image and identify multiple points of interest in the extracted faces of the plurality of users related to the eyes based on the user profile corresponding to the identified user. The eye-tracking unit (130) is configured to extract a portion of image capturing the eyes in the extracted human faces based on the identified plurality of points of interest and determine the plurality of gaze parameters of the at least one identified user from the extracted portion of the image capturing the eyes.

Further, the eye-tracking unit (130) is configured to determine a plurality of gaze directions in which the identified user is gazing based on the plurality of gaze parameters of the identified user and determine the area of interest to the identified user based on the plurality of gaze directions of the identified user. The plurality of gaze directions of the identified user is determined by configuring the eye-tracking unit (130) to compare the determined plurality of gaze parameters of the identified users with the at least one user profile corresponding to the at least one identified user; determine a plurality of eye-ball models for the identified users; and determine the plurality of gaze directions of the identified users based on the plurality of eye-ball models of the identified users. The eye-ball models can be any of existing eye-ball models. The user profile corresponding to the identified user is present in a user profile database (150).

The eye-tracking unit (130) is configured to determine a plurality of intercepts of the plurality of gaze directions of the at least one identified user with a plurality of areas of interests in the environment from a database of environmental profiles and determine the plurality of areas of interest in the environment that encloses the intercept of the areas of interest in the environment and the gaze direction.

The control unit (140) controls the plurality of imaging sensors (120) and orient the plurality of imaging sensors (120) relative to a common grid of reference; control the plurality of illumination sources (110), and orient the plurality of areas of interest in the environment and the plurality of imaging sensors (120) with respect to a fixed point of reference in the environment. The environmental profile database (160) includes multiple environmental profiles.

Figure 2:
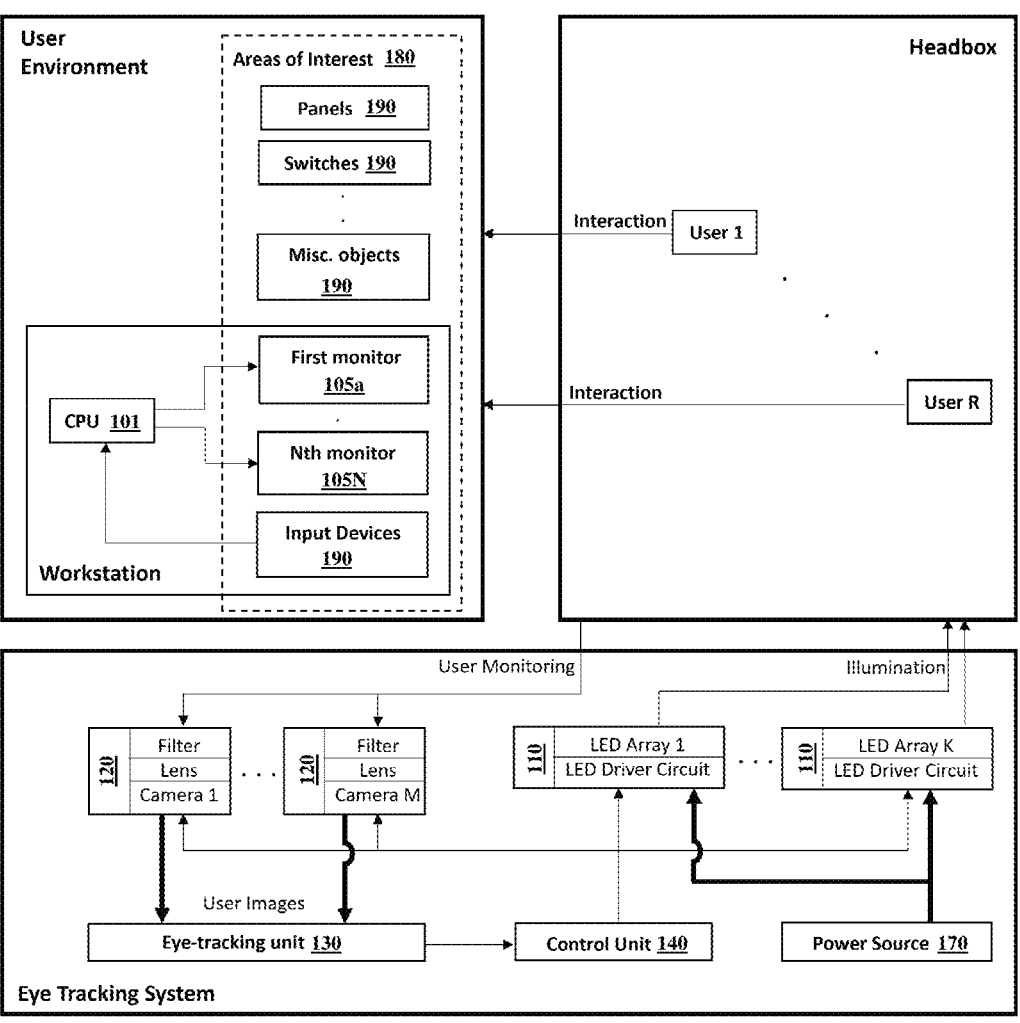
FIG. 2 illustrates connections between various components of the device for multi-user eye-tracking in the environment, according to the embodiments as disclosed herein.

FIG. 2 illustrates connections between various components of the device (1000) for multi-user eye-tracking in the environment, according to the embodiments as disclosed herein. Referring to the FIG. 2, an associated space in the user environment called the headbox is defined wherein the users' head is tracked to estimate eye gaze. A tool is developed to utilize the headbox and user environment constraints to place the imaging sensors (120) for tracking the eye. This tool identifies the locations of the imaging sensors (120) that maximize the headbox coverage while minimizing extreme head orientations. Similarly, another tool is developed to place the illumination sources (110) such that the entire headbox can be illuminated.

The illumination sources (110) comprise of light emitting diodes (LEDs) and driver circuits. The LEDs are selected such that they illuminate the headbox with light in the near infra-red (NIR) region. An external power source (170) is utilized to supply power to the illumination sources (110). The imaging sensors (120) comprise of a camera with a lens and a NIR bandpass filter (for example 820-910 nm). The device (1000) comprises the eye-tracking unit (130) that processes the images obtained from the imaging sensors (120) to estimate the users' gaze. The eye-tracking unit (130) utilizes the control unit (140) to generate control signals to control the operation of the imaging sensors (120) and the illumination sources (110).

Figure 4A:
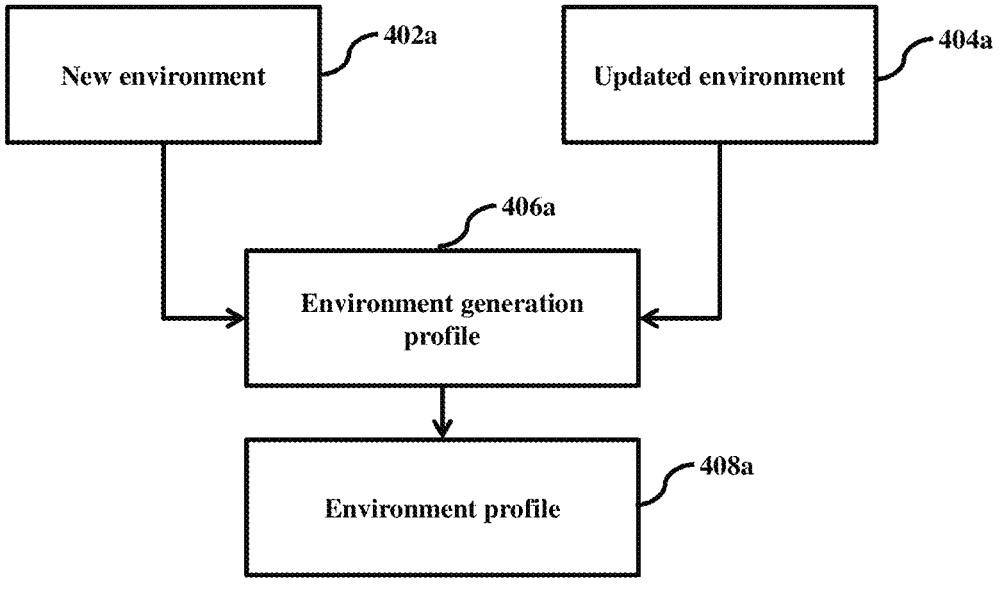
FIG. 4A is a flow chart illustrating a method for environment profile generation by the device, according to the embodiments as disclosed herein.

The device (1000) requires initializing the user environment profiles (User Environment profile Generation, explained in FIG. 4A). The user environmental profile must also be updated when the environment is modified. The user environment profile for monitors is generated by a tool that analyses images of the monitors taken by the users. Additional areas of interest of the objects in the user environment can be added manually.

Figure 4B:
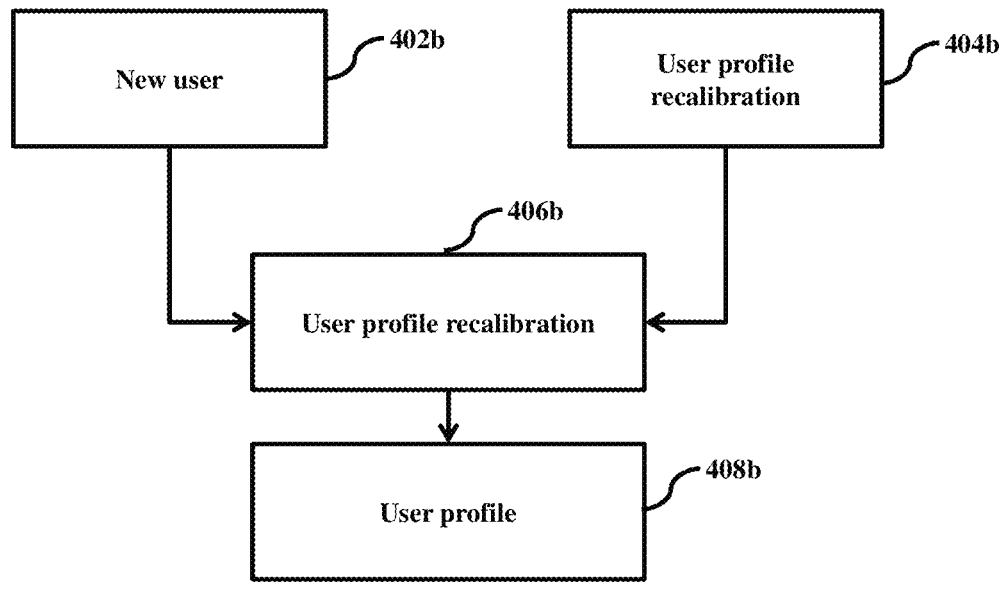
FIG. 4B is a flow chart illustrating a method for generating user profiles, according to the embodiments as disclosed herein.

The device (1000) also requires the generation of a user profiles for new users (User Calibration, explained in FIG. 4B). Existing users can also recalibrate their user profile if required. The user calibration step involves the user observing specified points on the monitors. The eye-tracking unit (130) analyzes the users' images from all the imaging sensors (120) to generate a user profile that maps positions of pupil center relative to reference points in the facial landmarks to corresponding gaze vectors. The device (1000) operation begins with loading the user environment profile and user profiles (Eye Tracking Approach, explained in FIG. 4C). The eye-tracking unit (130) loads the eye tracker configuration file to obtain key parameters required for operation. The eye-tracking unit (130) then instructs the control unit (140) to start the illumination sources (110). The control unit (140) is then instructed by the eye-tracking unit (130) to generate the imaging sensors (120) control signals. Image acquisition from the imaging sensors (120) is achieved via one of wireless interface and the USB 3.0 interface with the eye-tracking unit (130). A face detection technique is utilized to extract regions of the images containing human faces. Face recognition techniques are used to identify users in the images to enable the use of the corresponding user profile. The face-land marking module is then invoked to identify key points of interest in the detected faces. The images of the eyes are then extracted from the images to identify the pupil size and location parameters. The compute unit then estimates the head orientation using the facial landmarks. The eye-tracking unit (130) then combines the information on head orientation and relative position of pupil center to determine the gaze vector. The eye-tracking unit (130) then determines the intercept of the gaze vector on the user environment profile to estimate the gaze location.

For example, consider that multiple users in a supermarket view regions of interest where products are placed. Consider that an advertising agency wants to know user's interest in specific beauty products. In the proposed method the device (1000) illuminates faces of multiple users gazing the region of interest comprising the specific beauty products in the super-market. The device (1000) then captures images of the multiple users gazing at the specific beauty products and also determines the identity of the users in the captured image. Once the identity of the users in the captured image is determined, then the device (1000) identifies the user profile corresponding to the identified user based on the determined identity. Further, the device (1000) determines multiple gaze parameters of the identified user based on the user profile corresponding to the identified user, determines the directions in which the users are gazing while observing the specific beauty products based on the gaze parameters of the identified user and determines the exact area of interest to the identified user based on the gaze directions of the identified user.

FIG. 3 is a flow chart illustrating a method for multi-user eye-tracking in an environment by a device (1000), according to the embodiments as disclosed herein. Referring to the FIG. 3, at step 302, the method includes the device (1000) illuminating the faces of the plurality of users gazing at the region of interest in the environment. At step 304, the method includes the device (1000) Capturing at least one image of the plurality of users gazing the at least one region of interest in the environment. At step 306, the method includes the device (1000) determining the identity of the users in the captured image.

At step 308, the method includes the device (1000) identifying the user profile corresponding to the identified user based on the determined identity. At step 310, the method includes the device (1000) determining the plurality of gaze parameters of the identified user based on the at least one selected user profile corresponding to the identified user.

At step 312, the method includes the device (1000) determining the plurality of gaze directions of the identified user based on the plurality of gaze parameters of the identified user. At step 314, the method includes the device (1000) determining the area of interest to the identified user based on the plurality of gaze directions of the identified user.

FIG. 4A is a flow chart illustrating a method for user environment profile generation by the device (1000), according to the embodiments as disclosed herein. Referring to the FIG. 4A, at step 402a, the device (1000) determines the new environment or at step 404a, the device (1000) determines that the environment is modified. At step 406a, the environment generation profile is performed and at step 408a, the environment profile is generated. The device (1000) requires initializing the user environment profile. The user environment profile for monitors is generated by a tool that analyses images of the monitors taken by the users. Further, the areas of interest of the objects in the user environment can be added manually.

FIG. 4B is a flow chart illustrating a method for generating the user profiles, according to the embodiments as disclosed herein. Referring to the FIG. 4B, at step 402b, the device (1000) determines the new users or at step 404b, determines that the user profile recalibration is required. Existing users can also recalibrate their user profile if required (step 406b). The user calibration step involves the user observing specified points on the monitors.

Figure 4C:
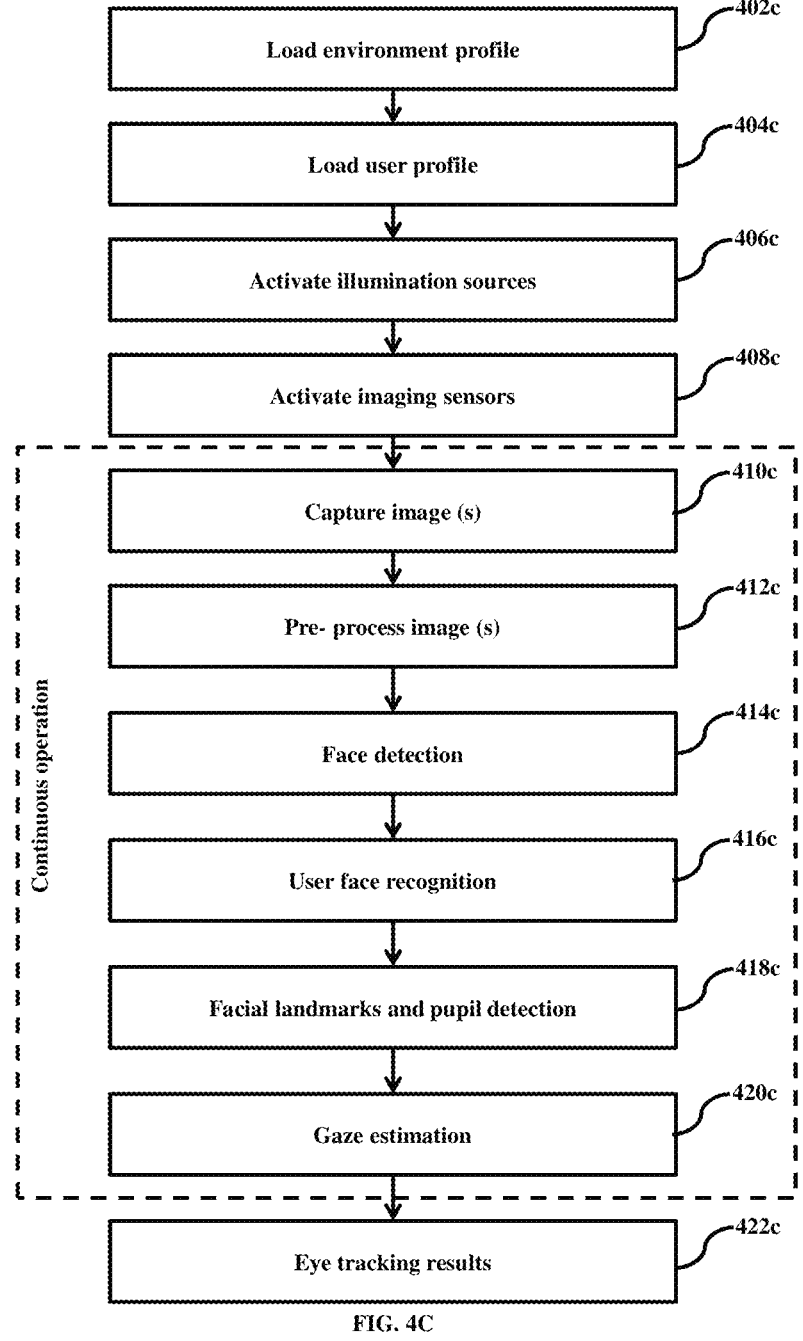
FIG. 4C is a flow chart illustrating a method for tracking the eye of multiple users by the device, according to the embodiments as disclosed herein.

FIG. 4C is a flow chart illustrating a method for tracking the eye of multiple users by the device (1000), according to the embodiments as disclosed herein. Referring to the FIG. 4C, at step 402c, the environment profile is loaded and at step 404c, the user profile is loaded. At step 406c, the illumination sources (110) are activated and at step 408c, the imaging sensors (120) are activated. At step 410c, the device (1000) captures image(s) the images of the users faces and at step 412c, the device (1000) pre-processes the image(s). At step 414c, the device (1000) detects the face and at step 416c, the device (1000) recognizes the face of the user and performs the facial landmarks and pupil detection (step 418c). Finally, at step 418c, the device (1000) estimates the gaze and at step 420c, the device (1000) provides the eye tracking results. The eye tracking results include obtaining eye gaze and pupil size for each user and each eye. Further, the eye gaze and pupil size are used to obtain derived quantities such as blink duration etc.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A device (1000) for simultaneously tracking gaze of multiple users in environments having individual and shared areas of visual interest, wherein the device (1000) comprises:

a plurality of illumination sources (110) configured to illuminate face(s) of at least one user gazing at least one region of interest in the environment;

a plurality of imaging sensors (120) configured to capture at least one image of the face(s) of at least one user gazing the at least one region of interest in the environment;

an eye-tracking unit (130) configured to:

determine an identity of at least one user of a plurality of users in the captured image;

identify at least one user profile corresponding to the at least one identified user based on the determined identity;

determine a plurality of gaze parameters of the at least one identified user based on the at least one selected user profile corresponding to the at least one identified user;

determine a plurality of gaze directions of the at least one identified user based on the plurality of gaze parameters of the at least one identified user; and determine at least one area of interest to the at least one identified user based on the plurality of gaze directions of the at least one identified user, wherein the at least one region of interest comprises imaginary surfaces defined within the environment for gaze tracking, and wherein the eye-tracking unit (130) is configured to coordinate operation of the plurality of illumination sources (110) and the plurality of imaging sensors (120) based on at least one of user profiles or an environment profile to enable capture of images of faces of the plurality of users gazing the at least one region of interest.

2. The device (1000) as claimed in claim 1, wherein the plurality of gaze parameters comprises a pupil size of the at least one identified user, a location of each eye of the at least one identified user in the captured image and an orientation of a head of the at least one identified user in the captured image.

3. The device (1000) as claimed in claim 1, wherein the eye-tracking unit (130) is configured to coordinate operation of the plurality of illumination sources (110) and the plurality of imaging sensors (120) comprises:

illuminate faces of at least one user of the plurality of users gazing the at least one region of interest in the environment, wherein the regions of interest in the environment are the imaginary surfaces in the environment where the eye gaze tracking is to be performed;

control the plurality of imaging sensors (120) based on the user profiles and the environment profile; and capture at least one image of the faces of the plurality of users gazing the at least one region of interest in the environment.

4. The device (1000) as claimed in claim 1, wherein the eye-tracking unit (130) is configured to identify the at least one user profile corresponding to the at least one identified user based on the determined identity comprises:

determine head orientation and pupil location of the at least one identified user;

determine a plurality of points of interest in the environment to the at least one identified user; and identify at least one user profile corresponding to the at least one identified user.

5. The device (1000) as claimed in claim 1, wherein the eye-tracking unit (130) is configured to determine the plurality of gaze parameters of the at least one identified user based on at least one selected user profile corresponding to at least one identified user comprises:

extract the faces of at least one user of the plurality of users from at least one captured image;

identify a plurality of points of interest in the extracted faces of the plurality of users related to the eyes, based on the at least one user profile corresponding to the at least one identified user;

extract a portion of image capturing the eyes in the extracted human faces based on the identified plurality of points of interest; and determine the plurality of gaze parameters of the at least one identified user from the extracted portion of the image capturing the eyes.

6. The device (1000) as claimed in claim 1, wherein the eye-tracking unit (130) is configured to determine the gaze direction of the at least one identified user, based on the plurality of gaze parameters of the at least one identified user comprises:

compare the determined plurality of gaze parameters of the identified users with the at least one user profile corresponding to the at least one identified user, wherein the at least one user profile corresponding to the at least one identified user is present in a database of user profiles;

determine a plurality of eye-ball models for the identified users;

determine the plurality of gaze directions of the identified users based on the plurality of eye-ball models of the identified users.

7. The device (1000) as claimed in claim 1, wherein the eye-tracking unit (130) is configured to determine at least one area of interest to at least one identified user based on the plurality of gaze directions of at least one identified user comprises:

determine a plurality of intercepts of the plurality of gaze directions of the at least one identified user with a plurality of individual and shared areas of interests in the environment from a database of environmental profiles; and determine the plurality of areas of interest in the environment that encloses the intercept of the areas of interest in the environment and the gaze direction.

8. The device (1000) as claimed in claim 1, comprises a control unit (140), wherein the control unit (140) is configured to perform at least one of: control the plurality of imaging sensors (120) and orient the plurality of imaging sensors (120) relative to a common grid of reference; control the plurality of illumination sources (110), and orient the plurality of areas of interest in the environment and the plurality of imaging sensors (120) with respect to a fixed point of reference in the environment.

9. The device (1000) as claimed in claim 1, comprises a user profile database (150) and an environmental profile database (160).

10. A method for simultaneous multi-user eye-tracking in an environment having individual and shared areas of visual interest by a device (1000), wherein the method comprises:

illuminating, by the device (1000), face(s) of at least one user of a plurality of users gazing on at least one region of interest in the environment;

capturing, by the device (1000), at least one image of the plurality of users gazing the at least one region of interest in the environment;

determining, by the device (1000), an identity of at least one user of the plurality of users in the captured image;

identifying, by the device (1000), at least one user profile corresponding to the at least one identified user based on the determined identity;

determining, by the device (1000), a plurality of gaze parameters of the at least one identified user based on the at least one selected user profile corresponding to the at least one identified user;

determining, by the device (1000), a plurality of gaze directions of the at least one identified user based on the plurality of gaze parameters of the at least one identified user; and determining, by the device (1000), at least one area of interest to the at least one identified user based on the plurality of gaze directions of the at least one identified user, wherein the at least one region of interest comprises imaginary surfaces defined within the environment for gaze tracking, and wherein the eye-tracking unit (130) is configured to coordinate operation of the plurality of illumination sources (110) and the plurality of imaging sensors (120) based on at least one of user profiles or an environment profile to enable capture of images of faces of the plurality of users gazing the at least one region of interest.

11. The method as claimed in claim 10, wherein the plurality of gaze parameters comprises a pupil size of the at least one identified user, a location of each eye of the at least one identified user in the captured image and an orientation of a head of the at least one identified user in the captured image.

12. The method as claimed in claim 10, wherein the eye-tracking unit (130) is configured to coordinate operation of the plurality of illumination sources (110) and the plurality of imaging sensors (120) comprises:

illuminating, by the device (1000), face(s) of at least one user of the plurality of users gazing on at least one region of interest in the environment, wherein the regions of interest in the environment are imaginary surfaces in the environment where the eye gaze tracking is to be performed;

controlling, by the device (1000), the plurality of imaging sensors (120) based on user profiles and environment profiles; and capturing, by the device (1000), at least one image of the faces of the plurality of users gazing the at least one region of interest in the environment.

13. The method as claimed in claim 10, wherein identifying, by the device (1000), the at least one user profile corresponding to the at least one identified user based on the determined identity comprises:

determining, by the device (1000), head orientation and pupil location of the at least one identified user;

determining, by the device (1000), a plurality of points of interest in the environment to the at least one identified user; and identifying, by the device (1000), at least one user profile corresponding to the at least one identified user.

14. The method as claimed in claim 10, wherein determining, by the device (1000), the plurality of gaze parameters of the at least one identified user based on the at least one selected user profile corresponding to the at least one identified user comprises:

extracting, by the device (1000), the face(s) of at least one user of the plurality of users from the at least one captured image;

identifying, by the device (1000), a plurality of points of interest in the extracted faces of the plurality of users related to the eyes based on the at least one user profile corresponding to the at least one identified user;

extracting, by the device (1000), a portion of image capturing the eyes in the extracted human faces based on the identified plurality of points of interest; and determining, by the device (1000), the plurality of gaze parameters of the at least one identified user from the extracted portion of the image capturing the eyes.

15. The method as claimed in claim 10, wherein determining, by the device (1000), the plurality of gaze directions of the at least one identified user based on the plurality of gaze parameters of the at least one identified user comprises:

comparing, by the device (1000), the determined plurality of gaze parameters of the identified users with the at least one user profile corresponding to the at least one identified user, wherein the at least one user profile corresponding to the at least one identified user is present in a database of user profiles;

determining, by the device (1000), a plurality of eye-ball models for the identified users;

determining, by the device (1000), the plurality of gaze directions of the identified users based on the plurality of eye-ball models of the identified users.

16. The method as claimed in claim 10, wherein determining, by the device (1000), the at least one area of interest to the at least one identified user based on the plurality of gaze directions of the at least one identified user comprises:

determining, by the device (1000), a plurality of intercepts of the plurality of gaze directions of the at least one identified user with a plurality of areas of interests in the environment from a database of environmental profiles; and determining, by the device (1000), the plurality of areas of interest in the environment that encloses the intercept of the areas of interest in the environment and the gaze direction.

17. The method as claimed in claim 12, wherein the device (1000) performs at least one of: control the plurality of imaging sensors (120) and orient the plurality of imaging sensors (120) relative to a common grid of reference; control the plurality of illumination sources (110), and orient the plurality of areas of interest in the environment and the plurality of imaging sensors (120) with respect to a fixed point of reference in the environment.

18. The method as claimed in claim 12, wherein the device (1000) comprises a user profile database (150) and an environmental profile database (160).

19. The method as claimed in claim 12, wherein the at least one user profile is generated by the device (1000) by:

determining, by the device (1000), at least one user observing specified points in the environment, including but not limited to, specific points on the displays;

determining, by the device (1000), positions of pupil center of the eye of the at least one user;

mapping, by the device (1000), the determined positions of pupil center of the eye of the at least one user relative to reference points in facial landmarks; and generating, by the device (1000), the user profile for the at least one user based on the mapping.

20. The method as claimed in claim 12, wherein the environment profile is generated by the device (1000) by:

determining, by the device (1000), positions of a plurality of individual and shared regions of interest in the environment;

mapping, by the device (1000), the determined plurality of regions of interest in the environment relative to reference points in the environment; and generating, by the device (1000), the environment profile based on the mapping.

* * * * *